US008868617B2

(12) United States Patent
Dunnell et al.

(10) Patent No.: US 8,868,617 B2
(45) Date of Patent: Oct. 21, 2014

(54) COMMON CONNECTION DEFINITIONS FOR DATABASE CLIENTS

(75) Inventors: Lawrence E. Dunnell, Redmond, WA (US); Loic Raymond Robert Julien, Seattle, WA (US); Maryela E. Weihrauch, San Jose, CA (US); Paul A. Ostler, Yakima, WA (US); Stephen A. Brodsky, Los Gatos, CA (US); Tony K. Leung, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 790 days.

(21) Appl. No.: 12/646,372

(22) Filed: Dec. 23, 2009

(65) Prior Publication Data

US 2011/0153675 A1 Jun. 23, 2011

(51) Int. Cl.
*G06F 17/30* (2006.01)
(52) U.S. Cl.
CPC .................... *G06F 17/3056* (2013.01)
USPC .......................................... 707/803
(58) Field of Classification Search
USPC ........................... 707/795, 802, 803
See application file for complete search history.

(56) References Cited

U.S. PATENT DOCUMENTS

| 5,303,367 A | 4/1994 | Leenstra et al. |
| 5,555,409 A | 9/1996 | Leenstra et al. |
| 5,832,505 A * | 11/1998 | Kasso et al. ............... 1/1 |
| 2004/0054569 A1* | 3/2004 | Pombo et al. ............... 705/7 |
| 2006/0143156 A1* | 6/2006 | Dykes et al. ............... 707/2 |
| 2006/0195783 A1* | 8/2006 | Davis et al. ................ 715/513 |

FOREIGN PATENT DOCUMENTS

| JP | 07219824 | 8/1995 |
| JP | 2008276462 | 11/2008 |

OTHER PUBLICATIONS

Vimercati-et al.; "Trust Management Services in Relational Databases"; ACM Digital Library; pp. 149-159; Mar. 2007.
Devany-et al.; "Implicit Connection to an SQL Database"; IP.com. IBM TDB; v36 n10 pp. 9-10; Oct. 1, 1993.

* cited by examiner

*Primary Examiner* — Robert Beausoliel, Jr.
*Assistant Examiner* — Nirav K Khakhar
(74) *Attorney, Agent, or Firm* — Mohammed Kashef; Edell, Shapiro & Finnan, LLC

(57) ABSTRACT

A system and method for connection of an application program to its corresponding database in a relational database system environment. Rather than embedding connection configuration information or properties in an application program, connection configurations are stored in a connection configuration repository. The connection configuration repository is likewise stored in a database within the relational database system environment. The connection configuration information stored in the configuration repository may be updated, revised, deleted or assembled into groups/subgroups, without affecting the application programs.

22 Claims, 5 Drawing Sheets

COMMON CONNECTION DEFINITIONS FOR DATABASE CLIENTS

BACKGROUND

1. Field of the Invention

The present invention relates to the field of computer database systems and, more specifically, to techniques for providing application programs access to their corresponding databases.

2. Description of the Related Art

Relational database systems are widely used in business, government and other organizations to record, store, process, share and otherwise warehouse information. A typical relational database system likely facilitates the storage and exchange of information between a number of databases and an even greater number of application programs.

When connecting to a database, an application developer needs to specify a list of properties associated with the database before a connection can be established. For new users it is difficult to find the minimal properties needed to connect to the databases. Java developers may not appreciate the implications of these options on application and database performance. Database administrators are more familiar with the appropriate options for each application—but may not have access to the individual applications. For databases that are widely used throughout an enterprise system, the process of monitoring and updating applications using particular database connection properties can involve a tremendous amount of work in identifying and then properly updating the affected applications. What's more, an enterprise may have thousands of these database systems, further adding to the work and overhead to the process of updating database connection properties.

Directory services have been created to provide an application developer with the ability to map the names of certain network resources to their respective network addresses. With the use of directory services, such as LDAP (Lightweight Directory Access Protocol), one could conceivably implement a directory service of database systems in order to facilitate the administration and management of these connection properties to the databases in an enterprise. However, problems exist with using a directory service or LDAP as most database administrators prefer to avoid introducing another system, such as a new directory service or LDAP, in order to minimize complexity and overhead associated with the enterprise.

SUMMARY OF THE INVENTION

The present invention can be implemented in accordance with numerous aspects consistent with the material presented herein. According to one embodiment of the present invention, a computer system can include at least one application program and at least one database. The computer system includes a relational database management system that contains a number of tables. The computer system includes also a connection configuration repository. The connection configuration repository facilitates the connection of a given application to its corresponding database, each operating within the computer system.

Another embodiment of the present invention is implemented as a method in a relational database system having a connection configuration repository comprising connection names and connection configurations. The method can include accepting a request to connect an application program to a corresponding database; parsing the request to obtain a connection name; obtaining connection configuration information associated with the connection name. The given application program is then connected to its corresponding database using the connection information.

Yet another embodiment of the present invention is implemented as on a computer medium having a computer program. The program is developed to connect a given application program to its corresponding database by use of a relational table for storing connection configurations. The relational table comprises connection names, identifying each of the databases and connection configurations associated with connecting any one of the applications to a corresponding database.

An article of manufacture comprising a computer useable storage medium having a computer readable program embodied in said medium, said computer readable program facilitating access to one or more relational databases with a connection configuration repository for storing connection configurations associated with at least one application and at least one database, said connection configuration repository comprising:

a) a plurality of connection names identifying said databases;

b) connection configurations each associating said at least one application to a corresponding said at least one database.

BRIEF DESCRIPTION OF THE DRAWINGS

To describe the foregoing and other exemplary purposes, aspects, and advantages, we use the following detailed description of an exemplary embodiment of the invention with reference to the drawings, in which.

Figure 1:
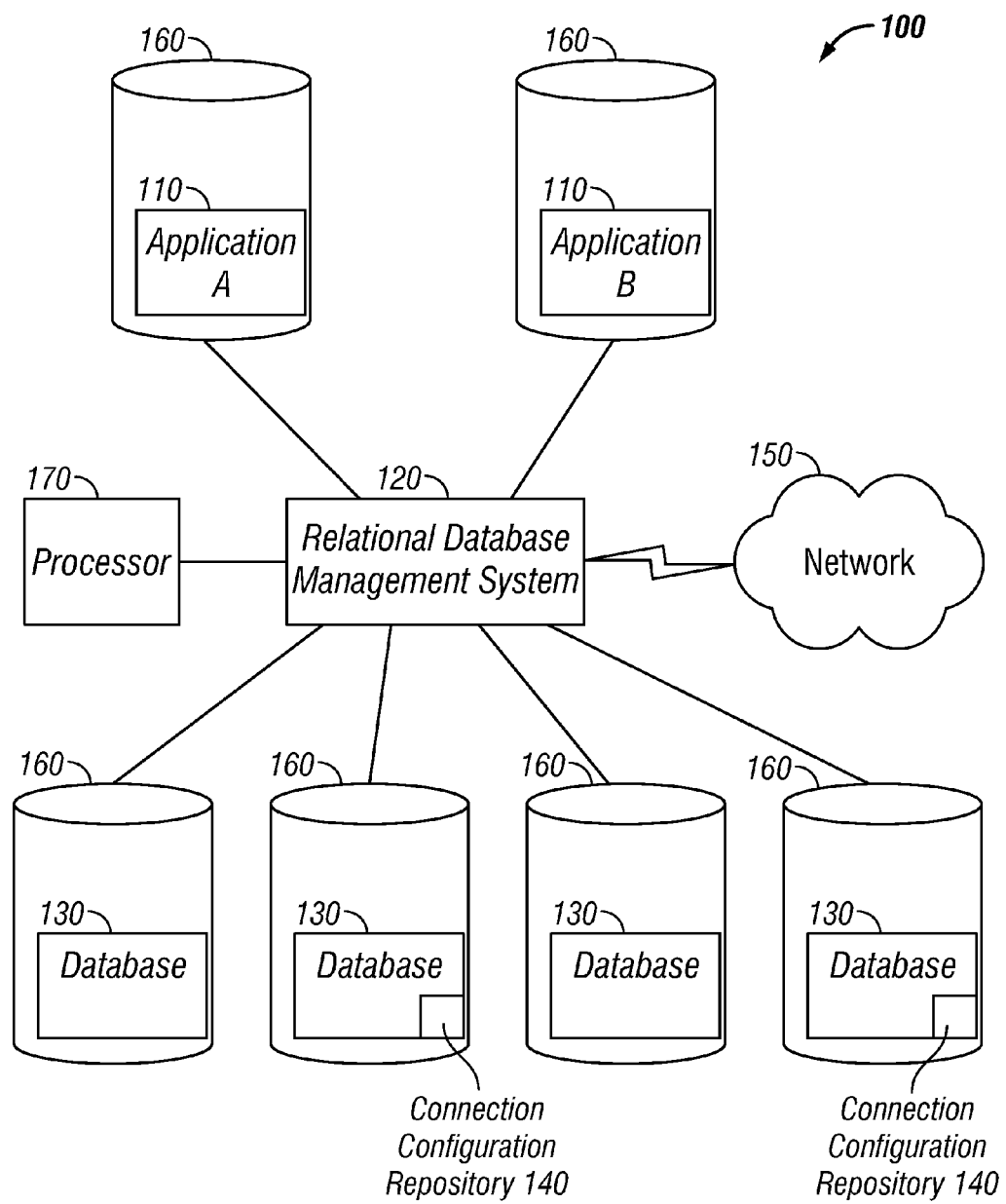
FIG. 1 is a high level block diagram showing a computer system according to an embodiment of the invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION OF THE INVENTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now in specific details to the drawings, and particularly to FIG. 1, there is shown a block diagram of a computer apparatus system 100 consistent with an embodiment of the present invention. For purposes of this invention, computer system 100 may represent any type of computer apparatus, information processing system or other programmable electronic device, including a client computer, a server computer, a portable computer, an embedded controller, a personal digital assistant, and the like. The computer system 100 comprises a processor 170, one or more storage devices 160, one or more applications 110, a relational database management system 120, one or more databases 130, and a connection configuration repository 140. The computer system 100 may be a stand-alone device or integrated into a larger system via a network 150. The network 150 may include the Internet, through which the computer system 100 may interact with other devices, enterprises or computing environments.

Figure 2:
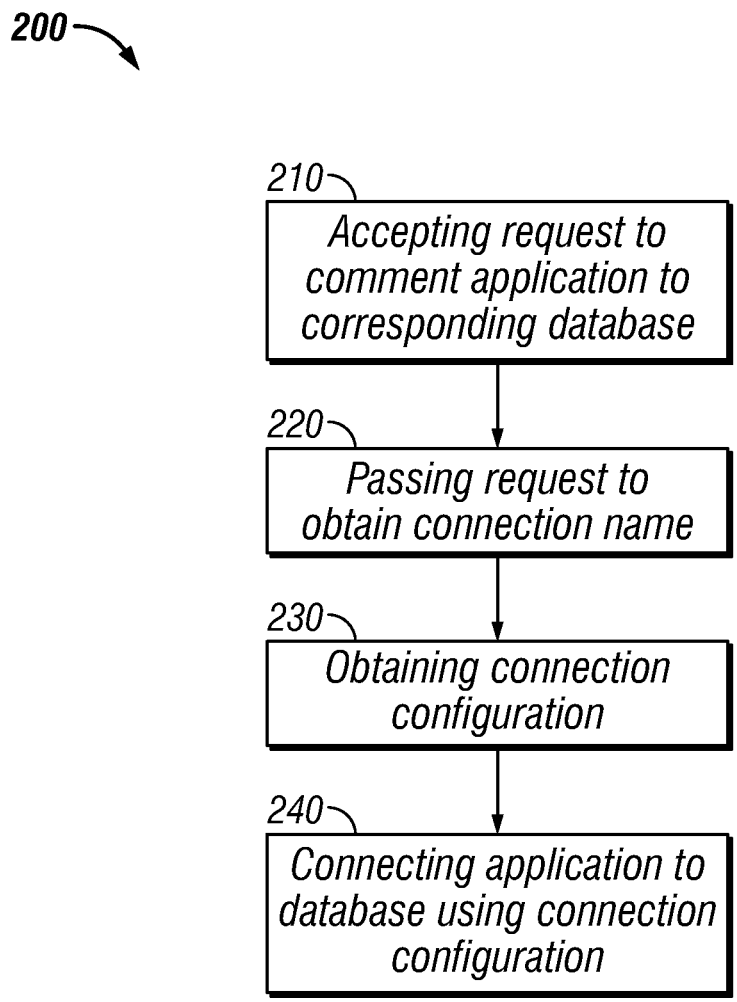
FIG. 2 is a flowchart of a method according to an embodiment of the invention.

Referring now to FIG. 2, there is illustrated a flow chart depicting an information processing method 200 according to an embodiment of the invention. The method begins at step 210 wherein a request to connect an application 110 to a corresponding database 130 is received and accepted. While reference is made to connecting a given application 110 to a single database 130, it is to be understood that the request to connect an application 110 to a database 130 may, as a practical matter, necessarily involve connecting the given application 110 to one or more databases 130.

The method continues at step 220 where the request is parsed to obtain a connection name. The connection name is the name assigned to the database 130 associated with the given application 110 and is established, in advance, by the database administrator. The connection name is then made available to the application developer so that the developed application may take advantage of the connection name and to subsequently have properties of the associated database retrieved.

The method continues at step 230 where connection configuration information is obtained from the connection configuration repository 140. The connection configuration information is that information the relational database management system 120 requires to connect the given application 110 to its corresponding database 130. Connection configuration information would typically include hostname, port numbers, cursor isolation level and current schema. Connection configuration information may be initially entered by the database administrator, or authorized user. Consistent with the role of a database administrator, default connection configuration information may be entered by the database administrator. Default connection configuration information may include information associated with a standard, or default, database to be used in instances where either a specific connection configuration has not been provided, or in instances where incomplete connection configuration information is provided. The default connection configuration may also include standard information in instances where only a subset of complete connection configuration information is known or available. In so doing, the database administrator or authorized user could populate a given connection configuration repository 140 with partial information—leaving remaining information to be populated by the system and method of the present invention.

Consistent further with the role of the database administrator, any connection configuration information may be overridden with information associated with preferred, or otherwise different, connection configuration information. For example, the database administrator may elect to exercise control over the system or connection between a given application and database by overriding connection configuration information currently existing in the connection configuration repository 140 with preferred connection configuration information.

Finally, application 110 is connected to its corresponding database 130 at step 240. The step 240 facilitates the actual connection of a given application to its corresponding database according to connection configuration information that has been retrieved from the connection configuration repository 140—accounting for that information that has been either properly entered directly, by default, or overridden.

In the preferred embodiment of the invention, the connection configuration repository 140 is implemented as an information processing apparatus or computer comprising a relational table and stored in any one database 130. Indeed, the use of tables in relational database systems is well understood. In particular, data in the table are structured as entries in columns and rows. Each column in the table defines a particular attribute, while each row in the table defines a particular tuple. In its simplest form, the relational table of the present invention comprises attributes that identify connection names and connection configuration information. The relational table may also include other optional information—such as a version indicator attribute, representing when a particular connection configuration was created. In so doing, the database administrator or authorized user could assess whether a particular connection configuration is sufficiently current and, if not, elect to update a given connection configuration with corresponding information associated with a more recent version.

Groups and Subgroups

The connection configuration repository 140 may further organized into logical groups to meet the needs of different users. For example, a developer, database administrator or system user needing to access shared database connections could do so by arranging a set of database connections into a logical grouping. The logic associated with any such logical grouping would likely be related to how the individual (developer, database administrator or system user) views, groups or associates those groupings. The connection subgroup may contain subgroups to further organize the connection configurations. While connection group names must be unique within a connection configuration repository 140, connection subgroup names can be the same—so long as those subgroup names are in separate groups.

Setting Up a Connection Configuration Repository

Figure 3:
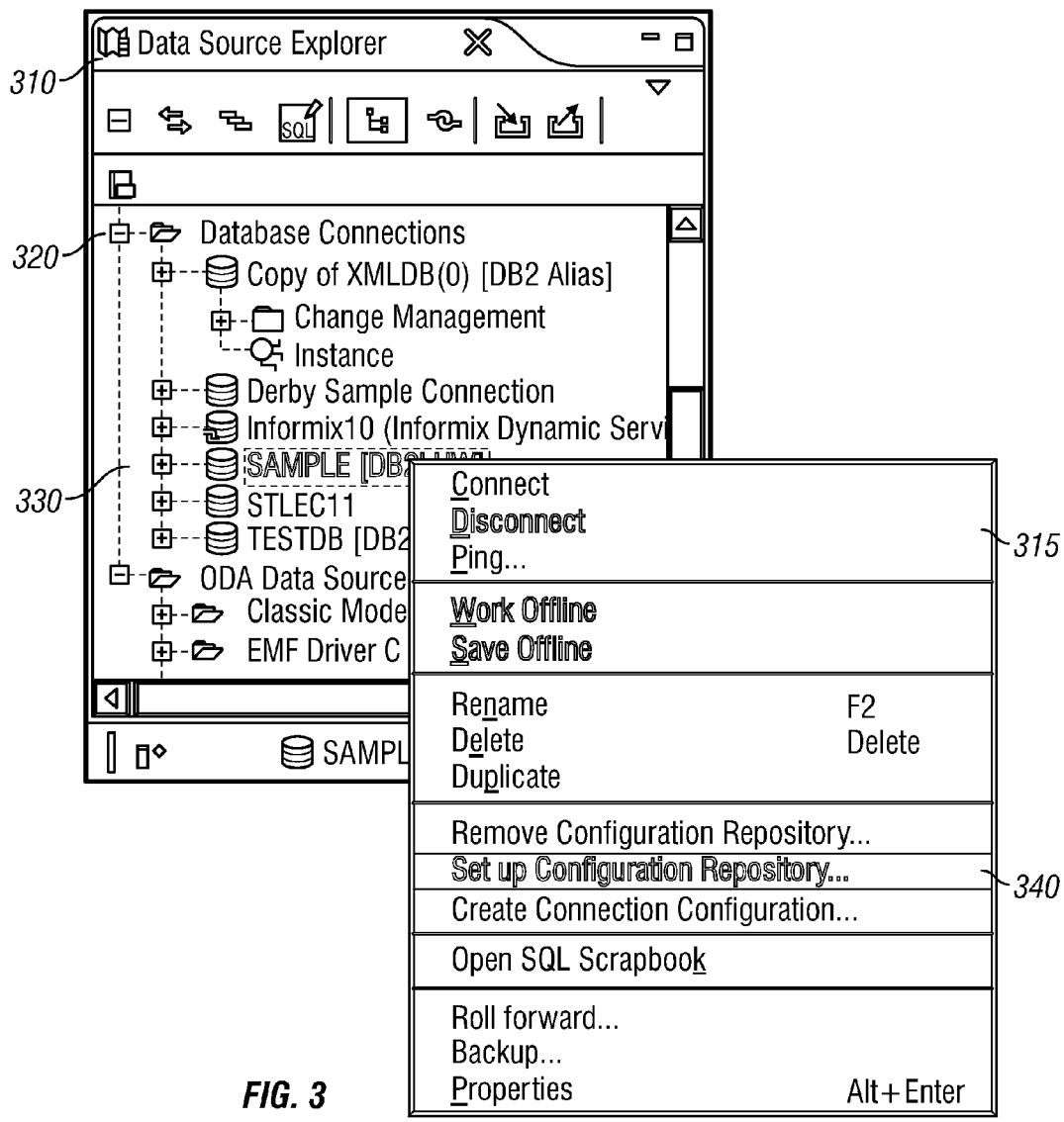
FIG. 3 is a diagram illustrating a graphical user interface depicting a hierarchy of overlapping window prompts facilitating the Set Up of a Connection Configuration Repository.

In the preferred embodiment of the invention, the database administrator sets up connection configuration repositories 140. It is to be understood, however, that any authorized user could be granted access to set up connection configuration repositories 140. Setting up the connection configuration repository 140 may be further facilitated by use of a graphical user interface. Referring to FIG. 3, the database administrator or authorized user may invoke a "Set up Configuration Repository" command 340 through a familiar hierarchy of graphical user interfaces.

FIG. 3 illustrates a hierarchy of overlapping window menus facilitating the Set Up of a Configuration Repository 340 command option. Referring still to FIG. 3, a user would launch the Data Source Explorer 310 function by selecting a corresponding icon or entry in a menu selection. The Data Source Explorer 310 function likewise offers the user the option of selecting Database Connections 320 item selection, from which the SAMPLE 330, or otherwise appropriate, item is selected. Upon selecting SAMPLE 330, an overlapping window 315 is created, displaying a set of options associated with managing the connection configuration.

The connection configuration repository 140 may contain connection configuration information for all database platforms or connections associated with a particular computing environment. For example, representative database platforms may include DB2® for Linux®, DB2 for Z/OS®, DB2 for iSeries, Informix® Dynamic Server, UNIX®, and Windows®. Table 1 contains a representative setup.sql script for creating configuration repository for DB2 for Linux, UNIX, and Windows.

TABLE 1

```
CREATE SCHEMA IBMPDQ;
CREATE TABLE IBMPDQ.CONNECTION (
DATABASE VARCHAR (255),
NAME VARCHAR (255) NOT NULL,
DB_VENDOR VARCHAR (255),
DB_VERSION VARCHAR (255),
OS VARCHAR (255),
OWNER VARCHAR (255),
VERSION INTEGER
);
CREATE TABLE IBMPDQ.CONNECTION_PROPS (
NAME VARCHAR (255) NOT NULL,
PROFILE_TYPE VARCHAR (255),
```

TABLE 1-continued

```
PROPERTY_KEY VARCHAR (255),
PROPETY_VALUE VARCHAR (255),
FLAG VARCHAR (255)
);
CREATE TABLE IBMPDQ.GROUP (
GROUP_PATH VARCHAR (1000) NOT NULL,
NAME VARCHAR (255),
DESCRIPTION VARCHAR (255),
VERSION INTEGER,
OWNER VARCHAR (255),
);
CREATE TABLE IBMPDQ.GROUP_CONNECTION (
GROUP_PATH VARCHAR (1000) NOT NULL,
CONNECTION_NAME VARCHAR (255) NOT NULL
);
ALTER TABLE IBMPDQ.CONNECTION ADD CONSTRAINT CONNECTION_PK
PRIMARY KEY (NAME);
ALTER TABLE IBMPDQ.GROUP ADD CONSTRAINT GROUP_PK PRIMARY KEY
(GROUP_PATH);
ALTER TABLE IBMPDQ.CONNECTION_PROPS ADD CONSTRAINT
CONN_PROPS_FK FOREIGN KEY (NAME)
REFERENCES IBMPDQ.CONNECTION (NAME)
ON DELETE CASCADE;
ALTER TABLE IBMPDQ.GROUP_CONNECTION ADD CONSTRAINT GP_CONNG_FK
FOREIGN KEY (GROUP_PATH)
REFERENCES IBMPDQ.GROUP (GROUP_PATH)
ON DELETE CASCADE;
ALTER TABLE IBMPDQ.GROUP_CONNECTION ADD CONSTRAINT
   GP_CONNC_FK FOREIGN KEY (CONNECTION_NAME)
REFERENCES IBMPDQ.CONNECTION (NAME)
ON DELETE CASCADE;
```

Connecting to the Connection Configuration Repository

Figure 4:
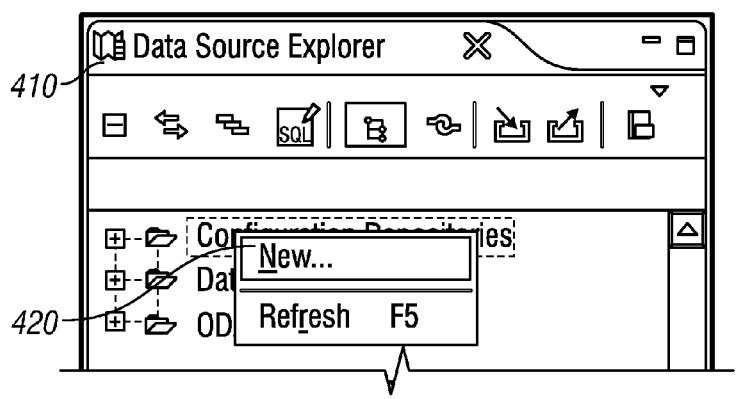
FIG. 4 is a diagram illustrating a graphical user interface depicting a hierarchy of overlapping window prompts facilitating Adding a new Connection Configuration Repository.

Upon setting up the connection configuration repository 140, the database administrator or authorized user may connect to the configuration repository and populate it with connection configurations. A graphical user interface 410, as illustrated in FIG. 4, facilitates administering a connection configuration repository 140 through a hierarchy of commands. While the example in FIG. 4 illustrates a connection to a "New" configuration repository 420, the graphical user interface likewise facilitates a connection to an existing configuration repository.

Creating Connection Groups and Subgroups

Figure 5:
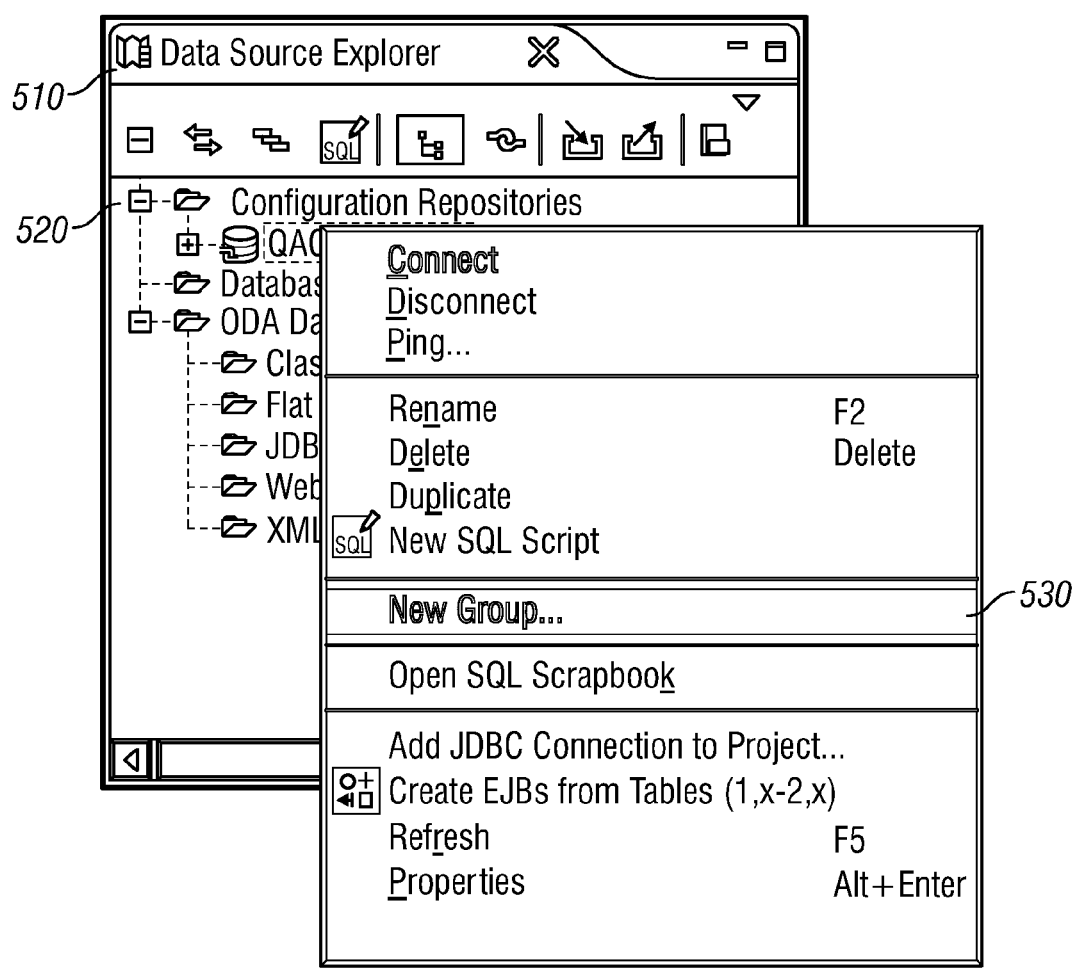
FIG. 5 is a diagram illustrating a graphical user interface depicting a hierarchy of overlapping window prompts facilitating the adding of a New Group to a Connection Configuration Repository.

As has been previously noted, upon establishing a connection configuration repository 140 the database administrator or authorized user may organize connection configurations into one or more connection configuration groups or subgroups. Referring to FIG. 5, creation of the connection configuration group may be facilitated by use of a graphical user interface. Referring still to FIG. 5, a user would launch the Data Source Explorer 510 function by selecting a corresponding icon or entry in a menu selection. By selecting a particular repository in the Configuration Repositories 520 option, an overlapping window is created and prompts the user with a set of additional options, including the New Group 530 command option. Connection configuration groups may contain subgroups to further organize connection configurations. Subgroup names may be the same, so long as they are in separate groups, as illustrated in FIG. 6.

Figure 6:
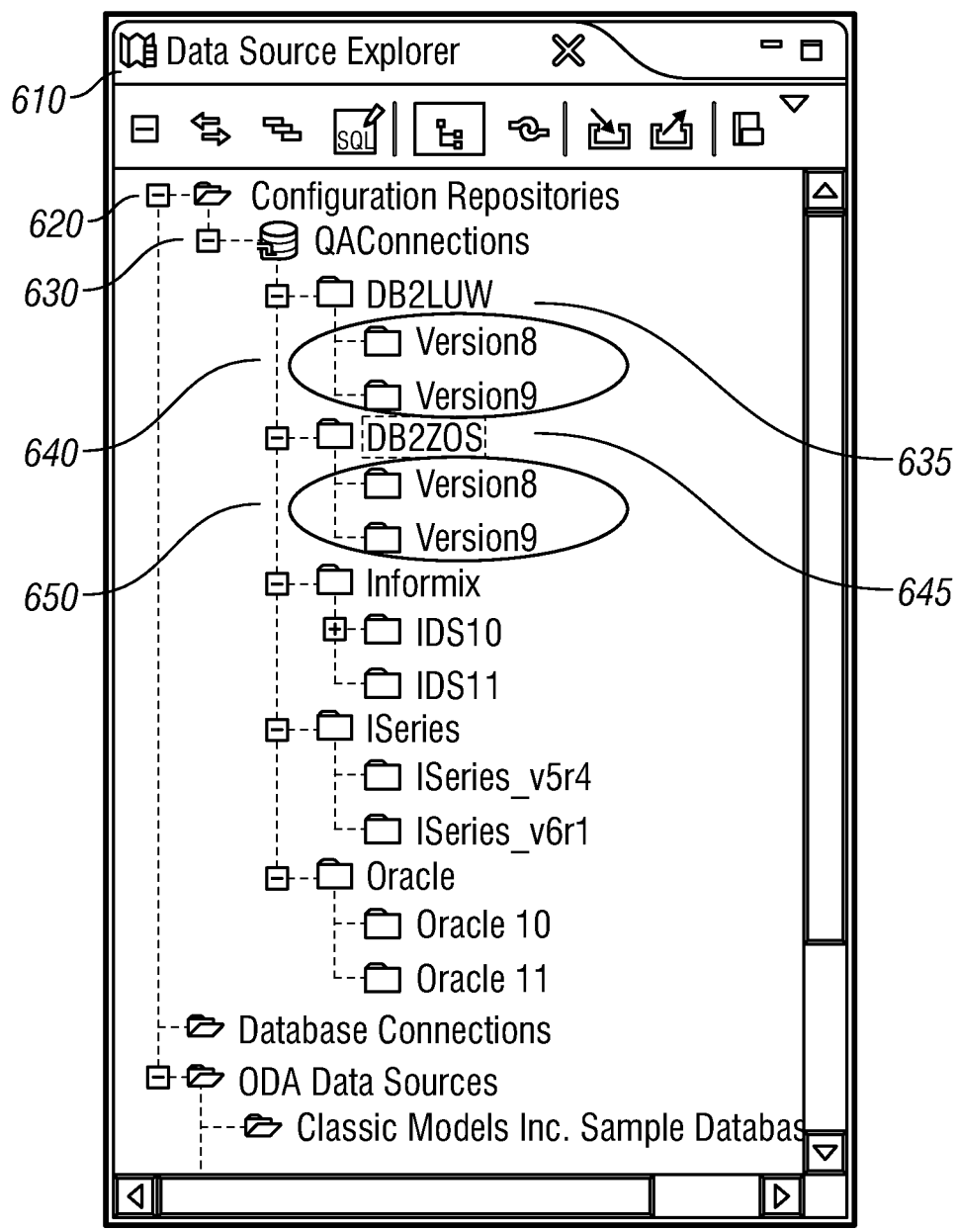
FIG. 6 is a diagram illustrating a graphical user interface depicting a hierarchy of overlapping windows illustrating a sample relationship between Groups and Subgroups within a Connection Configuration Repository.

Referring still to FIG. 6, a user could launch the Data Source Explorer 610 function by selecting a corresponding icon or entry in a menu selection. Upon selecting and expanding the Configuration Repositories 620 menu item, connection configuration repositories are likewise displayed. FIG. 6 further illustrates that separate sets of connection configuration subgroups 640, 650 may have identical names, so long as being part of separate connection configuration groups 635, 645. FIG. 6 also illustrates how a particular connection configuration subgroup 640, 650 may include different versions of a connection configuration within a group 635, 645. Such a connection configuration subgroup 640, 650 structure likewise offers the database administrator or authorized user the flexibility of assigning a given connection configuration a version number. The connection configuration subgroup may also include additional options, such as offering the database administrator or authorized user the option of assigning a default connection configuration. That is, a connection configuration that is available when either specific connection configuration information is unavailable or is otherwise incomplete. Further, the database administrator or authorized user may elect to override a connection configuration while updating a Configuration Repository 620, group 635, 645 or subgroup 640, 650. Another additional option may offer overriding a particular connection configuration. A connection configuration may be overridden, for example, when the database administrator elects to exercise control over a particular connection—irrespective of a selection that might otherwise be made by a user.

In the preferred embodiment, a connection group may be removed by invoking, for example, a "Delete Group" command. Upon deleting a connection configuration group, all connection configurations within the group are also deleted. However, any database connections that were created using the connection configurations contained in the deleted connection group are not affected by the delete command.

An example of a commercially available tool to implement and manage connection configuration repositories 140 is Optim™. Support for common connection configurations is also included in InfoSphere™ Data Architect. Each of these product offerings are made available by IBM.

According to an embodiment of the invention, a computer readable medium, such as a CDROM can include program instructions for operating the programmable computer according to the invention. Thus, while it is important to note that the present invention has been described in the context of a fully functioning data processing system and method, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of signal bearing media include ROMs, DVD-ROMs, and transmission-type media, such as digital and analog communication links, wired or wireless communications links using transmission forms, such as, for example, radio frequency, light wave transmissions and the Internet. The signal bearing media make take the form of coded formats that are decoded for use in a particular data processing system.

What has been shown and discussed is a highly-simplified depiction of a programmable computer apparatus. Those skilled in the art will appreciate that a variety of alternatives are possible for the individual elements, and their arrangement, described above, while still falling within the scope of the invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to included the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Therefore, while there has been described what is presently considered to be the preferred embodiment, it will understood by those skilled in the art that other modifications can be made within the spirit of the invention. The above description(s) of embodiment(s) is not intended to be exhaustive or limiting in scope. The embodiment(s), as described, were chosen in order to explain the principles of the invention, show its practical application, and enable those with ordinary skill in the art to understand how to make and use the invention. It should be understood that the invention is not limited to the embodiment(s) described above, but rather should be interpreted within the full meaning and scope of the appended claims.

What is claimed is:

1. A computer system comprising:
    an application stored on a first storage device;
    a database stored on a second storage device; and
    a connection configuration repository separate from said first storage device for connecting said application to said database using a connection configuration associated with said database, said connection configuration repository comprising a relational table that includes connection configuration information required to connect one or more applications including said application to a plurality of databases, wherein said connection configuration information comprises a plurality of connection names each identifying a database and information required to connect with each database.

2. The computer system of claim 1, wherein said information required to connect with each database comprising at least one of a host name, a port number, a cursor isolation level and a schema associated with each database.

3. The computer system of claim 2, wherein said relational table further comprises a version indicator for each connection configuration representing when said connection configuration was last updated.

4. The computer system of claim 2, wherein said connection configuration is assigned as a default connection configuration.

5. The computer system of claim 2, wherein at least one connection configuration within said relational table is overridden with a connection configuration specified by a database administrator.

6. The computer system of claim 1, wherein said connection configuration repository comprises a plurality of groups associated with at least one database, and at least one group includes a plurality of sub-groups including different connection configuration information associated with a single database.

7. The computer system of claim 6, wherein any one of said connection configurations is updated with a more recent version.

8. The computer system of claim 1, wherein said database comprises a relational database management system.

9. A method of connecting an application on a first storage device to a database on a second storage device, the method comprising:
    in response to receiving a request to connect said application to said database, obtaining a connection configuration associated with said database from a connection configuration repository that is separate from said first storage device, wherein said connection configuration repository comprises a relational table that includes connection configuration information required to connect one or more applications including said application to a plurality of databases, and said connection configuration information comprises a plurality of connection names each identifying a database and information required to connect with each database; and connecting said application to said database using said connection configuration.

10. The method of claim 9, further comprising:

annotating at least one connection configuration within said connection configuration repository with a version indicator representing when said connection configuration was last updated.

11. The method of claim 10, further comprising:

updating at least one of said connection configurations with a more recent version.

12. The method of claim 9, wherein a default connection configuration is assigned as said connection configuration.

13. The method of claim 9, further comprising:

overriding said connection configuration with a connection configuration specified by a database administrator.

14. The method of claim 9, wherein said database comprises a relational database management system.

15. The method of claim 9, wherein said connection configuration repository comprises a plurality of groups associated with at least one database, and at least one group includes a plurality of sub-groups including different connection configuration information associated with a single database.

16. An article of manufacture comprising a computer useable storage medium having a computer readable program embodied in said medium, said computer readable program facilitating access to a database on a second storage device by an application on a first storage device that is separate from a location of the computer useable storage medium using a connection configuration obtained from a connection configuration repository, said connection configuration repository comprising a relational table that includes connection configuration information required to connect one or more applications including said application to a plurality of databases, wherein said connection configuration information comprises a plurality of connection names each identifying a database and information required to connect with each database.

17. The article of manufacture of claim 16, wherein the computer usable medium comprises a cd-rom.

18. The article of manufacture of claim 16, wherein the computer usable medium comprises one or more diskettes.

19. The article of manufacture of claim 16, wherein the computer usable medium comprises a memory of a workstation accessible via a communications network.

20. The article of manufacture of claim 19, wherein the communications network comprises the INTERNET.

21. The article of manufacture of claim 16, wherein said database comprises a relational database management system.

22. The article of manufacture of claim 16, wherein said connection configuration repository comprises a plurality of groups associated with at least one database, and at least one group includes a plurality of sub-groups including different connection configuration information associated with a single database.

* * * * *